United States Patent
Lee (10) Patent No.: US 10,263,511 B2
(45) Date of Patent: Apr. 16, 2019

(54) CHARGE PUMP SWITCHING CONTROLLER FOR REDUCING STANDBY CURRENT AND CHARGE PUMPING APPARATUS USING THE SAME

(71) Applicant: SK hynix Inc., Incheon-si, Gyeonggi-do (KR)

(72) Inventor: Myung Hwan Lee, Cheonansi Chungcheongnam-do (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/486,587

(22) Filed: Apr. 13, 2017

(65) Prior Publication Data

US 2018/0076709 A1    Mar. 15, 2018

(30) Foreign Application Priority Data

Sep. 9, 2016  (KR) .......................... 10-2016-0116545

(51) Int. Cl.
*G05F 1/10* (2006.01)
*G05F 1/46* (2006.01)
*H04N 5/357* (2011.01)
*G11C 5/14* (2006.01)
*H02M 3/07* (2006.01)

(52) U.S. Cl.
CPC ............. *H02M 3/07* (2013.01); *H02M 3/073* (2013.01)

(58) Field of Classification Search
CPC ........... H02M 3/07; H02M 3/073; G05F 1/10; G05F 1/46; G11C 5/14

USPC .............. 327/148, 157, 534–537; 363/59, 60
See application file for complete search history.

(56) References Cited

U.S. PATENT DOCUMENTS

| | | | |
|---|---|---|---|
| 5,574,634 A | 11/1996 | Parlour et al. | |
| 5,982,222 A * | 11/1999 | Kyung | G11C 5/145 327/536 |
| 6,812,775 B2 * | 11/2004 | Seo | H02M 3/073 327/536 |
| 7,268,612 B2 * | 9/2007 | Senda | G11C 5/145 327/536 |
| 7,439,794 B2 * | 10/2008 | Takeyama | H02M 3/1584 327/536 |
| 8,493,134 B2 * | 7/2013 | Hao | G06F 1/06 327/536 |
| 2007/0147140 A1 * | 6/2007 | Byeon | G11C 5/145 365/189.09 |

(Continued)

FOREIGN PATENT DOCUMENTS

KR           100909637 B1        7/2009

*Primary Examiner* — Brandon S Cole
(74) *Attorney, Agent, or Firm* — William Park & Associates Ltd.

(57) ABSTRACT

A charge pumping apparatus in accordance with an embodiment may include a charge pump output voltage detector, a pump oscillator, and a charge pump switching controller. The charge pump output voltage detector may detect a charge pump output voltage, and may selectively output an enable signal according to the detected charge pump output voltage. The pump oscillator may output an oscillation signal during a period of time when the enable signal is activated. The charge pump switching controller may selectively operate one of a first pump and a second pump according to a predetermined stabilization time, the enable signal, and the oscillation signal.

18 Claims, 6 Drawing Sheets

(56) References Cited

U.S. PATENT DOCUMENTS

| | | | |
|---|---|---|---|
| 2009/0237147 A1 | 9/2009 | Kim et al. | |
| 2010/0237930 A1* | 9/2010 | Byeon | G11C 5/145 327/536 |
| 2011/0238203 A1* | 9/2011 | Hao | G06F 1/06 700/121 |
| 2013/0248687 A1* | 9/2013 | Standley | H04N 5/357 250/208.1 |
| 2016/0149485 A1* | 5/2016 | Hong | H02M 3/07 327/536 |

* cited by examiner

CHARGE PUMP SWITCHING CONTROLLER FOR REDUCING STANDBY CURRENT AND CHARGE PUMPING APPARATUS USING THE SAME

CROSS-REFERENCE TO RELATED APPLICATION

The present application claims priority under 35 U.S.C 119(a) to Korean patent application number 10-2016-0116545 filed on Sep. 9, 2016, the disclosure of which is hereby incorporated by reference in its entirety.

BACKGROUND

Embodiments of the present disclosure generally relate to a charge pump switching controller for generating a high voltage and a charge pumping apparatus using the same, and more particularly to a charge pump switching controller that selectively operates different types of charge pumps by reflecting a reaction speed of a charge pump output voltage detector during a standby mode, and a charge pumping apparatus using the same.

Semiconductor memory devices use internal operating voltages to operate. These internal operating voltages generally include a core voltage (e.g., Vcore) supplied to a memory core region, a high voltage (e.g., VPP) needed for overdriving or word-line driving, a back-bias voltage (e.g., VBB) supplied as a bulk voltage of an NMOS transistor contained in a core region, and the like. Each of these internal operating voltages is generated by converting an external voltage (e.g., VDD) and a ground voltage (e.g., VSS), which are provided from external voltage supplies, into the internal operating voltages.

Here, the core voltage may be generated by stepping down the voltage from the external voltage to a predetermined level. In contrast, the generation of the high voltage requires a charge pumping apparatus to step up the voltage from the external voltage to the high voltage.

SUMMARY

An embodiment of the present disclosure relates to a charge pumping apparatus and a charge pump switching controller.

In embodiment, a charge pumping apparatus may include a charge pump output voltage detector, a pump oscillator, and a charge pump switching controller. The charge pump output voltage detector may detect a charge pump output voltage, and selectively output an enable signal according to the detected charge pump output voltage. The pump oscillator may output an oscillation signal during a period of time when the enable signal is activated. The charge pump switching controller may selectively activate one of a first pump and a second pump according to a predetermined stabilization time, the enable signal, and the oscillation signal.

The charge pump switching controller may operate the first pump according to the oscillation signal during the stabilization time after a standby mode starts. The charge pump switching controller may operate the second pump according to the oscillation signal after the stabilization time has passed. The charge pump switching controller may activate the first pump instead of the second pump when a predetermined condition is satisfied during a period of time when the second pump operates.

After the second pump starts to operate, if an operation time of the second pump becomes longer than a predetermined time, the charge pump switching controller may stop operating the second pump, and may activate the first pump.

The charge pump switching controller may include a tripler controller, an oscillation counter, a latch, a comparator, and an oscillation selector. The tripler controller may activate a tripler start signal during the stabilization time, after a standby mode starts. The oscillation counter may count the number of times the oscillation signal toggles during an activation period of the enable signal, and output a count value, which represents the number of times the oscillation signal toggles. The latch may latch the count value obtained when the tripler start signal is deactivated, and output a latch value. The comparator may calculate a compensation value using the latch value, and may output a switching control signal when the count value is higher than the compensation value. The oscillation selector may selectively activate one of the first pump and the second pump using the oscillation signal according to the tripler start signal and the switching control signal.

The oscillation selector may operate the first pump according to the oscillation signal during a period of time when the tripler start signal is activated. The oscillation selector may operate the second pump according to the oscillation signal during a period of time when the tripler start signal is deactivated.

If the switching control signal is activated during a period of time when the second pump operates, the oscillation selector may stop operating the second pump and then activate the first pump.

The oscillation selector may operate the first pump when the switching control signal is activated.

In an embodiment, a charge pump switching control device may include a tripler, a charge pump switching controller, and an oscillation selector. The tripler controller may selectively activate a tripler start signal according to an enable signal. The charge pump switching controller may output a switching control signal for switching the first pump and the second pump according to the enable signal, the tripler start signal, and an oscillation signal. The oscillation selector may selectively activate one of the first pump and the second pump according to the tripler start signal, the oscillation signal, and the switching control signal.

It is to be understood that both the foregoing general description and the following detailed description of embodiments are exemplary and explanatory.

DETAILED DESCRIPTION

Reference will now be made in detail to certain embodiments, examples of which are illustrated in the accompanying drawings. Wherever possible, the same reference numbers will be used throughout the drawings to refer to the same or like parts. In the following description, a detailed description of related known configurations or functions incorporated herein will be omitted when it may make the subject matter less clear.

Figure 1A:
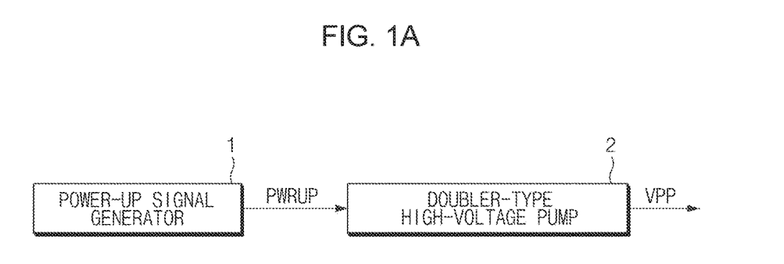
FIG. 1A is a diagram illustrating an example of a voltage doubler charge pumping apparatus.
Figure 1B:
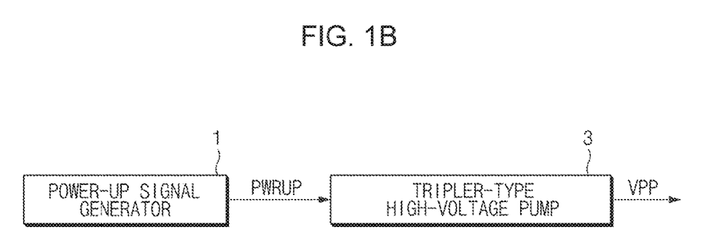
FIG. 1B is a diagram illustrating an example of a voltage tripler charge pumping apparatus.

In FIG. 1A, a charge pumping circuit may include a power-up signal generator 1 and a voltage doubler type charge pump 2. In FIG. 1A, a charge pumping circuit may include a power-up signal generator 1 and a voltage tripler type charge pump 3.

The charge pumping circuits illustrated in FIGS. 1A and 1B are driven by a power-up signal PWRUP. If it is determined during an initial operation period of the semiconductor memory device that an external voltage (e.g., VDD) is higher than a certain voltage, the voltage doubler type charge pump 2 and/or the voltage tripler type charge pump 3 may operate in response to the power-up signal PWRUP enabled (e.g., at a high level).

Figure 2:
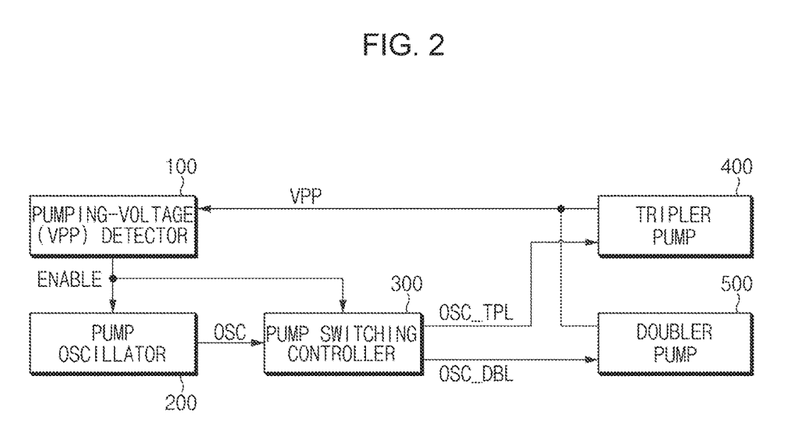
FIG. 2 is a diagram illustrating an example of a charge pumping apparatus according to an embodiment of the present disclosure.

FIG. 2 is a diagram illustrating an example of a charge pumping apparatus according to an embodiment of the present disclosure.

Referring to FIG. 2, the charge pumping apparatus may include a charge pump output voltage (VPP) detector 100, a pump oscillator 200, a charge pump switching controller 300, a tripler pump 400, and a doubler-type pump 500.

The charge pump output voltage detector 100 may detect a charge pump output voltage VPP generated by the tripler pump 400 or the doubler pump 500. If the detected charge pump output voltage VPP is lower than a predetermined voltage (e.g., a reference voltage), the charge pump output voltage detector 100 may activate an enable signal ENABLE. For example, if an output voltage of the tripler pump 400 or the doubler pump 500 is lower than a reference voltage, the charge pump output voltage detector 100 may activate the enable signal ENABLE so that the pump oscillator 200 outputs an oscillation signal OSC operating the tripler pump 400 or the doubler pump 500. A period of time during which the enable signal ENABLE is activated may vary depending on the output voltage of the tripler pump 400 or the doubler pump 500.

If the enable signal ENABLE generated by the charge pump output voltage detector 100 is activated (e.g., a high level), the pump oscillator 200 may output the oscillation signal OSC, which has successive pulses with uniform pulse widths, during an activation period of the enable signal ENABLE.

The charge pump switching controller 300 may selectively activate one of the tripler pump 400 and the doubler pump 500 according to a predetermined stabilization time, the enable signal ENABLE generated by the charge pump output voltage detector 100, and the oscillation signal OSC generated by the pump oscillator 200. For example, if the charge pump switching controller 300 enters a standby mode, the charge pump switching controller 300 may output a tripler oscillation signal OSC_TPL for operating the tripler pump 400 according to the oscillation signal OSC during a predetermined stabilization time. In this case, the stabilization time may be a time required to stabilize the internal voltages after the standby mode begins, and may be adjusted according to the enable signal ENABLE. For example, the stabilization time may be maintained until the number of times the enable signal ENABLE toggles reaches a predetermined number of times after the standby mode begins. If the stabilization time is completed, the charge pump switching controller 300 may output a doubler oscillation signal OSC_DBL for operating the doubler pump 500 according to the oscillation signal OSC. If a predetermined condition is satisfied while the doubler oscillation signal OSC_DBL is being output, the charge pump switching controller 300 may stop outputting the doubler oscillation signal OSC_DBL, and may output the tripler oscillation signal OSC_TPL. For example, the charge pump switching controller 300 may count the number of pulses of the oscillation signal OSC (e.g., how many times the oscillation signal OSC toggles). If the number of pulses of the oscillation signal OSC is higher than a predetermined value (e.g., predetermined compensation value), the charge pump switching controller 300 may switch the doubler oscillation signal OSC_DBL to the oscillation signal OSC_TPL. In this case, the predetermined value (e.g., predetermined compensation value) used as a reference value for switching the doubler oscillation signal (OSC_DBL) to the tripler oscillation signal (OSC_TPL) may be obtained by multiplying the number of pulses of the oscillation signal OSC counted up until a termination time point of the stabilization time by a predetermined compensation coefficient.

The tripler pump 400 may step up the voltage from the external voltage (VDD) to a predetermined voltage level (e.g., three times the external voltage) in response to the triple oscillation signal OSC_TPL provided from the charge pump switching controller 300.

The doubler pump 500 may step up the voltage from the external voltage (VDD) to a predetermined voltage level (e.g., two times the external voltage) in response to the doubler oscillation signal OSC_DBL provided from the charge pump switching controller 300.

Figure 3:
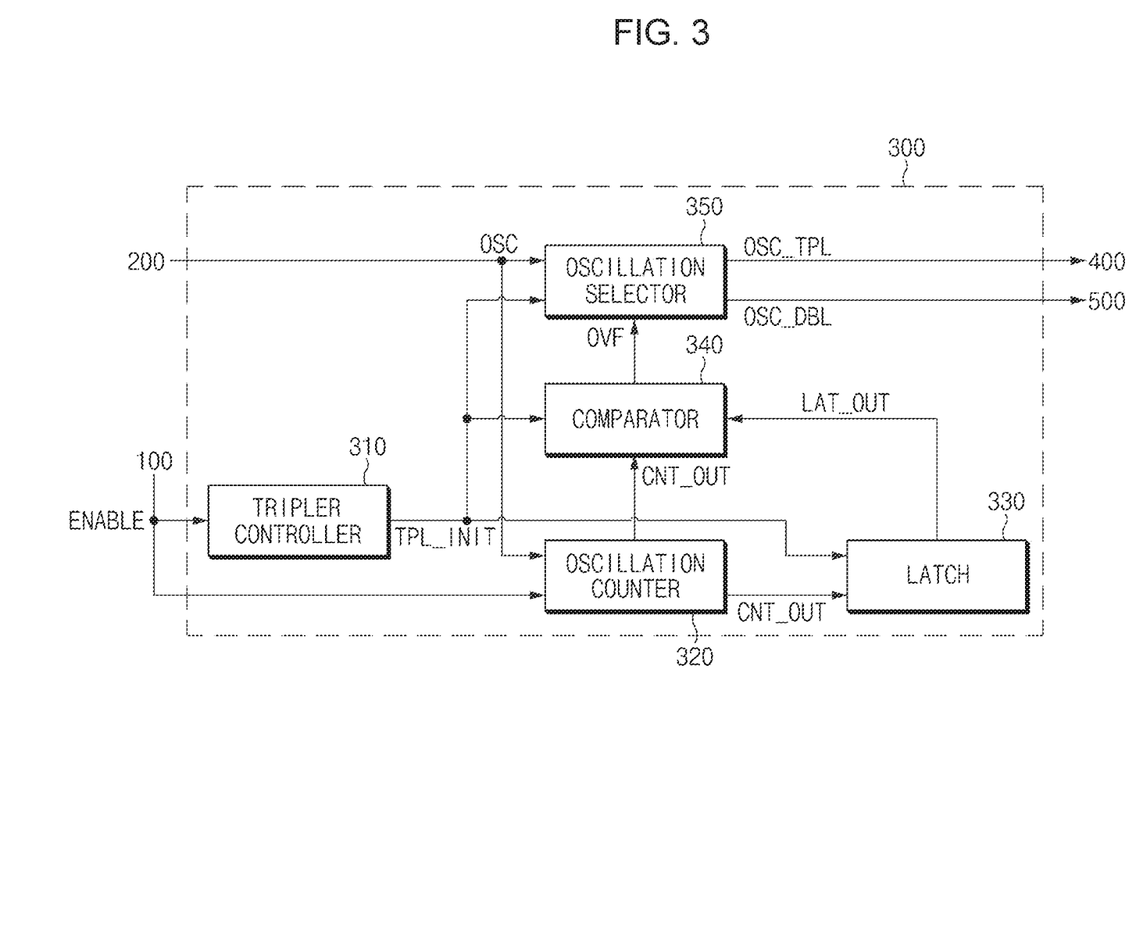
FIG. 3 is a diagram illustrating an example of a charge pump switching controller illustrated in FIG. 2.

FIG. 3 is a diagram illustrating an example of the charge pump switching controller illustrated in FIG. 2.

Referring to FIG. 3, the charge pump switching controller 300 may include a tripler controller 310, an oscillation counter 320, a latch 330, a comparator 340, and an oscillation selector 350.

The tripler controller 310 may receive the enable signal ENABLE from the pump voltage detector 100. If the standby mode begins, the tripler controller 310 may maintain a tripler start signal TPL_INIT at a high level during a predetermined stabilization time. Here, the stabilization time during which the tripler start signal TPL_INIT is maintained at a high level may be determined according to the number of pulses of the enable signal ENABLE (e.g., how many times the oscillation signal OSC toggles). For example, when the standby mode begins, the tripler controller 310 may immediately activate the tripler start signal TPL_INIT (e.g., to a high level), and may maintain the tripler start signal TPL_INIT at a high level until the enable signal ENABLE toggles a predetermined number of times (e.g., twice). In this case, the tripler start signal TPL_INIT may be deactivated (e.g., a low level) at a falling edge of the enable signal ENABLE.

The oscillation counter 320 may receive the enable signal ENABLE and the oscillation signal (OSC). The enable signal ENABLE may be generated by the charge pump output voltage detector 100, and the oscillation signal (OSC) may be generated by the pump oscillator 200. The oscillation counter 320 may count the number of pulses of the oscillation signal OSC (e.g., how many times the oscillation signal OSC toggles) during the activation period of the enable signal ENABLE, and may output a count value CNT_OUT, which represents the number of pulses of the oscillation signal OSC (i.e., the number of times the oscillation signal OSC toggles), to the comparator 340 and the latch 330. The count value CNT_OUT may be reset every time the enable signal ENABLE toggles. That is, the oscillation counter 320 may start new counting every time the enable signal (ENABLE) is activated.

The latch 330 may receive the count value CNT_OUT generated by the oscillation counter 320 and the tripler start signal TPL_INIT generated by the tripler controller 310. The latch 330 may latch the count value CNT_OUT obtained when the tripler start signal TPL_INIT is deactivated at a falling edge, and may output a latch value LAT_CNT to the comparator 340.

The comparator 340 may receive the tripler start signal TPL_INIT generated by the tripler controller 310, the count value CNT_OUT generated by the oscillation counter 320, and the latch value LAT_CNT generated by the latch 330. If the tripler start signal TPL_INIT is deactivated (e.g., a low level) during the standby mode, the comparator 340 may compare the count value CNT_OUT with a compensation value obtained by applying a predetermined compensation coefficient to the latch value LAT_CNT. If the count value CNT_OUT is higher than the compensation value, the comparator 340 may activate an overflow signal OVF acting as a switching control signal to a high level, and may output the activated overflow signal OVF to the oscillation selector 350. For example, the comparator 340 may multiply the latch value by the compensation coefficient (e.g., 1.5) to obtain a compensation value (i.e., LAT_CNT×1.5), and then may compare the compensation value (i.e., LAT_CNT×1.5) with the count value CNT_OUT. The activated overflow signal OVF may be deactivated at a falling edge of the enable signal ENABLE.

The oscillation selector 350 may receive the oscillation signal OSC generated by the pump oscillator 200, the tripler start signal TPL_INIT generated by the tripler controller 310, and the overflow signal OVF generated by the comparator 340. The oscillation selector 350 may selectively activate one of the tripler pump 400 and the doubler pump 500 using the oscillation signal OSC according to the tripler start signal TPL_INIT and the overflow signal OVF. For example, during a time period when the tripler start signal TPL_INIT is at a high level after the standby mode begins, the oscillation selector 350 may output the oscillation signal OSC_TPL according to the oscillation signal OSC so that the tripler pump 400 operates. If the tripler start signal TPL_INIT is deactivated (e.g., a low level), the oscillation selector 350 may activate the doubler pump 500 by outputting the doubler oscillation signal OSC_DBL according to the oscillation signal OSC. Specifically, if the overflow signal OVF becomes activated (e.g., a high level) in the middle of outputting the doubler oscillation signal OSC_DBL, the oscillation selector 350 may stop outputting the doubler oscillation signal OSC_DBL, and then output the tripler oscillation signal OSC_TPL so long as the overflow signal (OVF) is at the high level. That is, if the overflow signal OVF is activated during a time period when the tripler start signal TPL_INIT is deactivated, the oscillation selector 350 may switch the operation pump from the doubler pump 500 to the tripler pump 400.

Figure 4:
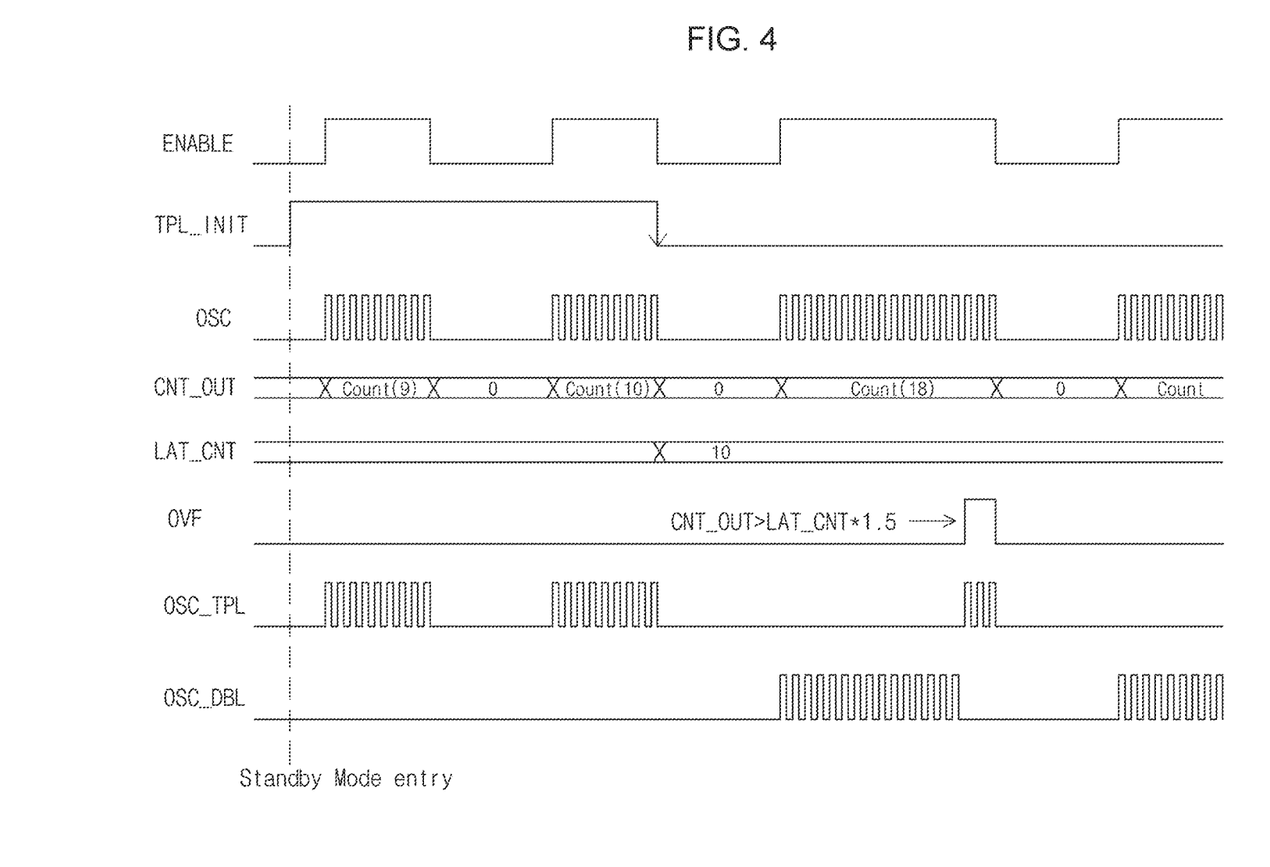
FIG. 4 is a timing diagram illustrating operations of the charge pumping apparatus having example configurations illustrated in FIGS. 2 and 3.

FIG. 4 is a timing diagram illustrating operations of the charge pumping apparatus having example configurations illustrated in FIGS. 2 and 3.

Referring to FIG. 4, after the standby mode begins, the tripler controller 310 may activate the triple start signal TPL_INIT (e.g., a high level). In this case, the charge pump output voltage detector 100 may continuously detect the charge pump output voltage VPP of the tripler pump 400 or the doubler pump 500, and may compare the charge pump output voltage VPP with a reference voltage.

If the detected charge pump output voltage VPP is lower than the reference voltage, the charge pump output voltage detector 100 may activate the enable signal ENABLE (e.g., a high level).

If the enable signal ENABLE is activated, the pump oscillator 200 may output the oscillation signal OSC, which has successive pulses with uniform pulse widths. Here, the oscillation signal OSC may be a signal that continuously toggles between high and low levels during an activation period of the enable signal ENABLE.

The oscillation selector 350 having received the oscillation signal OSC may output the tripler oscillation signal OSC_TPL to activate the tripler pump 400 according to the oscillation signal OSC. That is, if the oscillation selector 350 receives the oscillation signal OSC in a situation where the tripler start signal TPL_INIT is activated, the oscillation selector 350 may convert the oscillation signal OSC into the tripler oscillation signal OSC_TPL to activate the tripler pump 400, and may output the tripler oscillation signal OSC_TPL.

In this case, the oscillation counter 320 may count the number of times the oscillation signal OSC toggles (i.e., the number of pulses of the oscillation signal OSC generated in response to the enable signal ENABLE), and may output the count value CNT_OUT to the comparator 340 and the latch 330. The count value CNT_OUT may be reset whenever the enable signal ENABLE toggles.

In FIG. 4, the count value CNT_OUT of the oscillation signal OSC generated by the first enable signal ENABLE is "9," and the count value CNT_OUT of the oscillation signal OSC generated by the second enable signal ENABLE is "10."

If the enable signal ENABLE toggles a predetermined number of times (e.g., twice, as illustrated in FIG. 4) after activation of the tripler start signal TPL_INIT, the tripler controller 310 may deactivate the tripler start signal TPL_INIT (e.g., a low level) in response to the falling edge of the enable signal ENABLE.

If the tripler start signal TPL_INIT is deactivated, the latch 330 may latch the count value CNT_OUT generated at the falling edge of the tripler start signal TPL_INIT, and may output the latch value LAT_CNT to the comparator 340. In response to the latch value LAT_CNT provided by the latch 330, the comparator 340 may calculate a compensation value by multiplying the latch value LAT_CNT by a predetermined compensation value (e.g., 1.5), and may compare the received count value CNT_OUT with the compensation value.

In addition, if the tripler start signal TPL_INIT is deactivated, the oscillation selector 350 may output the doubler oscillation signal OSC_DBL to activate the doubler pump 500 according to the oscillation signal OSC. That is, if the oscillation selector 350 receives the oscillation signal OSC in a situation where the doubler start signal TPL_INIT is deactivated, the oscillation selector 350 may convert the oscillation signal OSC into the doubler oscillation signal OSC_DBL to activate the doubler pump 500, and may output the doubler oscillation signal OSC_DBL.

During a period when the doubler pump 500 operates, the oscillation counter 320 may count the number of times the oscillation signal OSC toggles, and may output the count value CNT_OUT to the comparator 340.

If the count value CNT_OUT is higher than the compensation value (e.g., LAT_CNT×1.5), the comparator 340 may activate the overflow signal OVF to a high level, and may output the high-level overflow signal (OVF) to the oscillation selector 350. For example, the enable signal ENABLE remains activated beyond a predetermined time for reasons such as an unexpected delay in reaching a desired charge pump output voltage VPP and an unexpected delay of the charge pump output voltage detector 100 in detecting the charge pump output voltage VPP. If the enable signal ENABLE is not deactivated within a predetermined time, the overflow signal OVF is deactivated.

If the overflow signal OVF is activated, the oscillation selector 350 may convert the oscillation signal OSC into the tripler oscillation signal OSC_TPL, and may output the tripler oscillation signal OSC_TPL. That is, the oscillation selector 350 may stop operating the doubler pump 400, and may start operating the tripler pump 400.

If the overflow signal is deactivated, the oscillation selector 350 may convert the oscillation signal OSC into the doubler oscillation signal OSC_DBL, and may output the doubler oscillation signal OSC_DBL.

As described above, during a predetermined stabilization time after the standby mode starts, the charge pumping apparatus according to an embodiment of the present disclosure may activate the tripler pump 400 to generate the charge pump output voltage VPP. After a lapse of the stabilization time, the charge pumping apparatus may activate the doubler pump 500 instead of the tripler pump 400 for energy efficiency purposes. If the operation time of the doubler pump 500 is longer than a predetermined time, the charge pumping apparatus may switch the pump to the tripler pump 400.

For example, an unexpected delay may occur when the charge pump output voltage detector 100 detects the charge pump output voltage VPP, and the delay of the charge pump output voltage detector 100 may prevent the enable signal ENABLE from being deactivated within a desired time. In this case, an additional oscillation signal OSC may unnecessarily occur. Therefore, the charge pumping apparatus according to an embodiment of the present disclosure may activate the doubler pump 500 after the stabilization time has passed since the standby mode started. In this case, if the enable signal ENABLE is not deactivated within a desired time, the charge pumping apparatus may switch the pump to the tripler pump 400.

Figure 5:
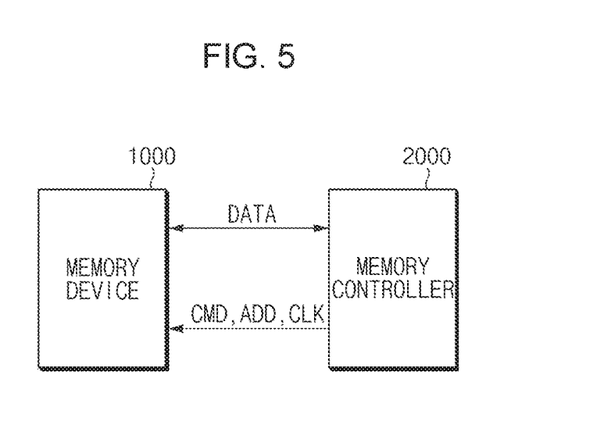
FIG. 5 is a diagram illustrating an example of a memory system using the charge pumping apparatus according to an embodiment of the present disclosure.

FIG. 5 is a diagram illustrating an example of a memory system using the charge pumping apparatus according to an embodiment of the present disclosure.

Referring to FIG. 5, the memory system may include a memory device 1000 and a memory controller 2000.

The memory device 1000 may store data DATA received from the memory controller 620 in response to a control signal provided from the memory controller 2000. The memory device 1000 may read the stored data DATA, and may output the read data to the memory controller 2000 according to control signals (e.g., a command signal CMD, an address signal ADD, and a clock signal CLK) received from the memory controller 2000. Examples of the memory device 1000 may include a volatile memory and a non-volatile memory. For example, the volatile memory may include a Dynamic Random Access Memory (DRAM), a mobile DRAM, a Static Random Access Memory (SRAM), etc. The non-volatile memory may include a Nor Flash Memory, a NAND Flash Memory, a Phase Change Random Access Memory (PRAM), a Resistive Random Access Memory (RRAM), a Spin Transfer Torque Random Access Memory (STTRAM), a Magnetic Random Access Memory (MRAM), etc. Although the memory device 1000 is denoted by a single block in FIG. 2, the memory device 1000 may be a module or a package that contains a plurality of memory chips.

The memory device may include the charge pumping apparatus of FIG. 2. That is, the charge pumping apparatus of the memory device 1000 may include the charge pump output voltage detector 100, the pump oscillator 200, the charge pump switching controller 300, the tripler pump 400, and the doubler pump 500.

During a predetermined stabilization time after the standby mode starts, the charge pumping apparatus of the memory device 1000 may activate the tripler pump 400 to generate a high voltage. After a lapse of the stabilization time, the charge pumping apparatus according to an embodiment of the present disclosure may activate the doubler pump 500 for energy efficiency purposes. In this case, if the operation time of the doubler pump 500 becomes longer than a predetermined time, the pump is switched to the tripler pump 400.

The memory controller 2000 may generate the control signals (e.g., CMD, ADD, and CLK) to control the memory device 1000. The memory controller 2000 may output the control signals (e.g., CMD, ADD, and CLK) to the memory device 1000, and may control data read/write operations of the memory device 1000. The memory controller 2000 may include a control device that is used to control data input/output (I/O) operations of memory devices 1000. The memory controller 2000 may be contained in a system controller or a central processing unit (CPU) when the memory system is used as a main memory of a computer system. The memory controller 2000 may include Integrated Device Electronics (IDE), Serial Advanced Technology Attachment (SATA), Small Computer System Interface (SCSI), Redundant Array of Independent Disks (RAID), Solid State Disk (SSD), external SATA (eSATA), Personal Computer Memory Card International Association (PCMCIA), a Universal Serial Bus (USB) memory, a Secure Digital (SD) card, a mini Secure Digital (mSD) card, a micro SD card, a high-capacity Secure Digital High Capacity (SDHC), a Memory Stick Card, a Smart Media (SM) card, a Multi Media Card (MMC), an Embedded MMC (eMMC), a Compact Flash (CF) card, etc.

As is apparent from the above description, the embodiments of the present disclosure may improve a pump switching method of the charge pumping apparatus, and may reduce a standby current during the standby mode.

Those skilled in the art will appreciate that embodiments of the present disclosure may be carried out in other ways than those set forth herein without departing from the spirit and essential characteristics of these embodiments. The above embodiments are therefore to be construed in all aspects as illustrative and not restrictive.

The above embodiments of the present disclosure are illustrative and not limitative. Various alternatives and equivalents are possible. The above embodiments are not limited by the type of deposition, etching polishing, and patterning steps described herein. Nor is the embodiment limited to any specific type of semiconductor device. For example, the present disclosure may be implemented in a dynamic random access memory (DRAM) device or non volatile memory device. Other additions, subtractions, or modifications are obvious in view of the present disclosure and are intended to fall within the scope of the appended claims.

What is claimed is:

1. A charge pumping apparatus comprising:
a charge pump output voltage detector configured to detect a charge pump output voltage, and selectively output an enable signal according to the detected charge pump output voltage;
a pump oscillator configured to output an oscillation signal during a period of time when the enable signal is activated; and
a charge pump switching controller configured to selectively activate one of a first pump and a second pump according to a predetermined stabilization time, the enable signal, and the oscillation signal,
wherein the charge pump switching controller includes a tripler controller configured to output a tripler start signal based on the enable signal, the tripler start signal continuously activated until the enable signal toggles a predetermined number of times after a standby mode starts.

2. The charge pumping apparatus according to claim 1, wherein:
the charge pump switching controller operates the first pump according to the oscillation signal during the stabilization time after a standby mode starts;
the charge pump switching controller operates the second pump according to the oscillation signal after the stabilization time has passed; and
the charge pump switching controller activates the first pump instead of the second pump when a predetermined condition is satisfied during a period of time when the second pump operates.

3. The charge pumping apparatus according to claim 2, wherein, after the second pump starts to operate, if an operation time of the second pump becomes longer than a predetermined time, the charge pump switching controller stops operating the second pump and then activates the first pump.

4. The charge pumping apparatus according to claim 3, wherein:
the charge pump switching controller counts a number of times the oscillation signal toggles; and
if the number of times the oscillation signal toggles is higher than a predetermined compensation value, the charge pump switching controller stops operating the second pump, and then activates the first pump.

5. The pump apparatus according to claim 1, wherein the first pump is a tripler pump, and the second pump is a doubler pump.

6. The pump apparatus according to claim 1, wherein the charge pump switching controller further includes:
an oscillation counter configured to count the number of times the oscillation signal toggles during an activation period of the enable signal, and output a count value, which represents the number of times the oscillation signal toggles;
a latch configured to latch the count value obtained when the tripler start signal is deactivated, and output a latch value;
a comparator configured to calculate a compensation value using the latch value, and output a switching control signal when the count value is higher than the compensation value; and
an oscillation selector configured to selectively activate one of the first pump and the second pump using the oscillation signal according to the tripler start signal and the switching control signal.

7. The charge pumping apparatus according to claim 1, wherein the tripler controller deactivates the tripler start signal at a falling edge of the enable signal.

8. The charge pumping apparatus according to claim 6, wherein the comparator calculates the compensation value by multiplying the latch value by a predetermined compensation coefficient.

9. The charge pumping apparatus according to claim 6, wherein:
the oscillation selector operates the first pump according to the oscillation signal during a period of time when the tripler start signal is activated; and
the oscillation selector operates the second pump according to the oscillation signal during a period of time when the tripler start signal is deactivated.

10. The charge pumping apparatus according to claim 9, wherein, if the switching control signal is activated during a period of time when the second pump operates, the oscillation selector stops operating the second pump and then activates the first pump.

11. The charge pumping apparatus according to claim 10, wherein the oscillation selector activates the first pump when the switching control signal is activated.

12. A charge pump switching control device comprising:
a tripler controller configured to output a tripler start signal based on the enable signal, the tripler start signal continuously activated until the enable signal toggles a predetermined number of times after a standby mode starts;
a charge pump switching controller configured to output a switching control signal for switching the first pump and the second pump according to the enable signal, the tripler start signal, and an oscillation signal; and
an oscillation selector configured to selectively activate one of the first pump and the second pump according to the tripler start signal, the oscillation signal, and the switching control signal,
wherein the oscillation signal is directly inputted into the charge pump switching controller.

13. The charge pump switching control device according to claim 12, wherein the tripler controller deactivates the tripler start signal at a falling edge of the enable signal.

14. The charge pump switching control device according to claim 12, wherein the charge pump switching controller includes:
an oscillation counter configured to count a number of times the oscillation signal toggles during a period of time when the enable signal is activated, and output a count value; and
a comparator configured to calculate a compensation value using the count value, compare the count value with the compensation value, and selectively output the switching control signal.

15. The charge pump switching control device according to claim 14, further comprising a latch configured to temporarily store the count value obtained when the tripler start signal is deactivated.

16. The charge pump switching control device according to claim 14, wherein the comparator calculates the compensation value by multiplying a predetermined compensation value by a count value obtained when the tripler start signal is deactivated.

17. The charge pump switching control device according to claim 16, wherein, if the count value obtained when the tripler start signal is deactivated is higher than the compensation value, the comparator activates the switching control signal.

18. The charge pump switching control device according to claim 12, wherein, in a standby mode, the oscillation selector activates the first pump according to the oscillation signal during a period of time when the tripler start signal is activated or during a period of time when the switching control signal is activated, and activates the second pump according to the oscillation signal during a period of time when the tripler start signal is deactivated or during a period of time when the switching control signal is deactivated.

* * * * *

UNITED STATES PATENT AND TRADEMARK OFFICE
CERTIFICATE OF CORRECTION

PATENT NO. : 10,263,511 B2
APPLICATION NO. : 15/486587
DATED : April 16, 2019
INVENTOR(S) : Myung Hwan Lee It is certified that error appears in the above-identified patent and that said Letters Patent is hereby corrected as shown below:

On the Title Page

Item (71) Applicant:
Replace "SK hynix Inc., Incheon-si, Gyeonggi-do (KR)" with --SK hynix Inc., Icheon-si, Gyeonggi-do (KR)--

Signed and Sealed this
Twenty-first Day of May, 2019

Andrei Iancu
*Director of the United States Patent and Trademark Office*